United States Patent [19]

Raj

[11] Patent Number: 4,506,895
[45] Date of Patent: Mar. 26, 1985

[54] SELF-ACTIVATING FERROFLUID SEAL APPARATUS AND METHOD OF USE

[75] Inventor: Kuldip Raj, Merrimack, N.H.

[73] Assignee: Ferrofluidics Corporation, Nashua, N.H.

[21] Appl. No.: 645,399

[22] Filed: Aug. 29, 1984

[51] Int. Cl.³ .............................................. F16J 15/40
[52] U.S. Cl. ......................................... 277/1; 277/80; 277/135
[58] Field of Search ............... 277/1, 80, 135, DIG. 7; 308/10, 36.1, 187.1, 187.2

[56] References Cited

U.S. PATENT DOCUMENTS

| 4,252,353 | 2/1981 | Raj et al. | 277/80 |
| 4,357,024 | 11/1982 | Raj | 277/80 X |
| 4,444,398 | 4/1984 | Black et al. | 277/80 X |

FOREIGN PATENT DOCUMENTS

| 55-107163 | 8/1980 | Japan | 277/80 |
| 783881 | 10/1957 | United Kingdom | 277/80 |

Primary Examiner—Robert S. Ward
Attorney, Agent, or Firm—Richard P. Crowley

[57] ABSTRACT

A low-cost, self-activating ferrofluid seal apparatus particularly useful as an exclusion seal with computer-disc-drive spindles, which seal apparatus comprises an annular, axially-polarized permanent magnet and first and second pole pieces in a magnetic-flux relationship with each side of the magnet and the one end of the pole pieces extending into a close, noncontacting relationship with the surface of a shaft element to be sealed to form a radial gap with the surface of the shaft and ferrofluid in the radial gap to effect a single-stage ferrofluid seal and wherein the annular permanent magnet has a thickness of not more than about 25 mils and the annular magnet has an energy product of about $1.8 \times 10^6$ gauss-oersteds or greater and the ferrofluid comprises a low-vapor-pressure ferrofluid having a magnetic saturation of at least 200 gauss or more.

18 Claims, 3 Drawing Figures

SELF-ACTIVATING FERROFLUID SEAL APPARATUS AND METHOD OF USE

BACKGROUND OF THE INVENTION

Ferrofluid-type seal apparatuses for use in sealing rotary shafts with single- or multiple-stage ferrofluid liquid O-ring seals about the shaft are well known. Ferrofluid seal apparatuses have been used as exclusion seals to protect one environment on one side of a shaft from contaminants in an environment on the other side of the shaft. Ferrofluid-type exclusion seals are particularly useful with computer-disc-drive spindles to prevent contamination in an environment from reaching a memory-disc area and where the exclusion seal does not require large pressure capacity. A standard ferrofluid exclusion seal presently employed comprises an annular, axially polarized ring-like permanent magnet adapted to surround a shaft and sandwiched between two identical pole-piece elements which are placed in a contacting magnetic-flux relationship with the one and the other polar ends of the permanent magnet. The pole-piece elements at the one end extend into a close, noncontacting relationship with the surface of the shaft to form a radial gaps therebetween. The ferrofluid is disposed and magnetically retained in the radial gaps on the insertion of a magnetically permeable shaft to form one or more liquid O-ring stages about the shaft which serve to form an exclusion seal.

Typically, for example, with a ferrofluid seal apparatus for use with a computer-drive shaft, the ferrofluid is shipped separately with the seal apparatus. The customer then installs the ferrofluid seal apparatus and inserts the shaft and then injects the ferrofluid inside the installed seal in order to activate the seal and to form a liquid O-ring seal about the shaft element inserted within the seal apparatus. This method of forming an exclusion seal is both time consuming and particularly subject to operator error in applying the proper quantity of the ferrofluid into the ferrofluid seal apparatus. The quantity of ferrofluid employed in the seal apparatus determines both the life and pressure capacity of the ferrofluid seal. It is therefore very desirable to supply a ferrofluid seal apparatus to a customer which already contains the proper quantity of ferrofluid, and which on the insertion of a magnetically permeable shaft into the seal apparatus, has the ferrofluid automatically filling the radial gap to provide the proper O-ring seal, thus in effect to be a self-activating seal.

The self-activating ferrofluid seal apparatuses have been disclosed in U.S. Pat. No. 4,252,328, and U.S. Pat. No. 4,252,353, both issued Feb. 24, 1981. The self-activating ferrofluid seal apparatuses described provide for self-activating, that is movement of the ferrofluid from a nonactivating to an activating sealing position within the radial gap upon the insertion of a magnetically permeable shaft. Such self-activating ferrofluid seal apparatuses are not wholly satisfactory, since the manufacturing cost of such self-activating seal apparatuses tend to be higher than for standard exclusion seals.

In addition, U.S. Pat. No. 4,357,024, issued Nov. 2, 1982, describes a ferrofluid seal apparatus designed for an extended ferrofluid seal life, and particularly for use as an exclusion seal with a computer-disc-drive shaft. The ferrofluid seal apparatus provides for a generally L-shaped pole pieces of the same or different width to form an interstage gap and a radial gap. In operation, the ferrofluid seal apparatus operates sequentially as a single-stage seal, and later, with the evaporation of the ferrofluid, a two-stage O-ring seal under each radial gap, thereafter a single-stage seal under one radial gap until seal failure, thereby providing a ferrofluid seal apparatus with an extended seal life.

It is therefore desired to provide for a new, low cost, self-activating seal of compact design which is easy to manufacture and assemble and to activate, and which has the characteristics extended seal life.

SUMMARY OF THE INVENTION

The invention relates to a ferrofluid seal apparatus, and a method of manufacturing and use of such seal apparatus. In particular, the invention concerns a low cost, self-activating, extended life, compact ferrofluid exclusion seal apparatus particularly useful in sealing computer-disc-drive shaft spindles for extended time periods.

The self-activating ferrofluid seal apparatus of the invention comprises a ferrofluid seal which employs a very thin axially polarized magnet, typically not greater than about 25 mils in thickness and generally from about 15 to 25 mils in uniform thickness to define a 15 to 25 mil thick interstage gap between the inner surfaces of the pole pieces at the one end. The permanent magnet employed is a high energy product magnet such that the flux density of about 1,000 gauss or higher is produced in the air interstage gap between the inner surfaces of the pole pieces at the one end, so that the ferrofluid is retained within the air gap during shipment, and for example, may have an energy product of about $1.8 \times 10^6$ gauss-oersteds or greater. In addition, the self-activating ferrofluid seal apparatus employs a high magnetization ferrofluid of low volatility generally having a magnetization of about 200 gauss or more, for example, 200 to 400 gauss, and a viscosity ranging from about 50 to 400 cps at 27° C. The ferrofluid seal apparatus thus defined with a radial gaps beneath the one, noncontacting end of the pole pieces ranging from about 2 to 10 mils, for example, 4 to 8 mils and with an interstage air gap between the pole pieces at the one end ranging from 15 to 25 mils. Typically, the magnetically permeable pole pieces employed with the ferrofluid seal apparatus may be uniformly equal or be unequal in thickness and generally are pole pieces ranging from about 25 to 60 mils in thickness. The ferrofluid seal apparatus generally includes an annular, nonmagnetic housing of aluminum or plastic at the other end of the pole pieces.

The ferrofluid seal apparatus of the invention has a permanent magnet thickness far less than the standard ferrofluid seal, with the thickness reduced to where the magnetically permeable pole-piece elements are separated by a gap in the range of about 10 to 25 mils, while the energy product of the permanent magnet is such that a high-flux density is produced in this gap to retain the ferrofluid therein in a nonactivating condition. In operation when a magnetically permeable shaft element, such as a spindle shaft, is inserted within the ferrofluid seal apparatus, so that the radial gap between the shaft and the one end of the pole piece is less than the interstage gap, for example, in the range of say 4 to 8 mils, the flux lines of the magnet change their flux path now to complete the magnetic circuit through the shaft so that the ferrofluid is drawn out of the interstage air gap between the two pole-piece elements into the radial gap between the pole-piece elements at the one end to provide a single-stage seal with the ferrofluid seal having a general sectional inverted T-shape form, such as in the manner described in U.S. Pat. No. 4,357,024. The ferrofluid seal of the invention thus provides for a significant reduction in axial length of the seal which is most desirable with computer-disc-drive uses, is easy to manufacture and assemble, while the seal is less expensive than the prior art self-activating seals because of the reduced thickness of the permanent magnet employed, while a longer seal life is obtained.

The magnetically permeable pole-piece elements employed are typically straight-sided elements of uniform thickness which define therebetween an air cavity in which the ferrofluid is retained at the one end of and between the pole pieces prior to insertion of the magnetically permeable shaft, for example, a nonactivated seal position. The ferrofluid is retained so that there is a slight bulge outwardly from the air cavity where the ferrofluid follows the lines of magnetic flux. However, the ferrofluid so retained in the inner diameter is not generally in contact with the packaging or shipping material of the seal. Another advantage of the ferrofluid seal is that the ferrofluid so retained in the air space prior to activation also effectively seals the air gap between the pole pieces and prevents loose microparticles in the air space from entering into the memory-disc area or the environment which is to be protected by the exclusion seal prior to activation. Some customers, particularly in the computer-disc field, are concerned about microparticles in the air cavity between the pole pieces, so that the present invention provides for the ferrofluid in the nonactivating condition to seal in those particles on the air cavity to provide a simple, effective, low cost ferrofluid seal.

In addition and optionally, ferrofluid may also be retained within an air cavity at the other end of the pole-piece elements so as to provide a static ferrofluid seal rather than a seal occasioned by the outer housing and elastomeric O-ring seals surrounding the other end of the pole-piece elements. The ferrofluid will also be retained in the annular outer surface to form an effective ferrofluid static exclusion seal.

The invention will be described for the purposes of illustration only in connection with particular embodiments, however, it is recognized that those persons skilled in the art may make various changes, additions, and improvements to the described embodiments without departing from the spirit and scope of the invention.

DESCRIPTION OF THE EMBODIMENTS

Figure 1:
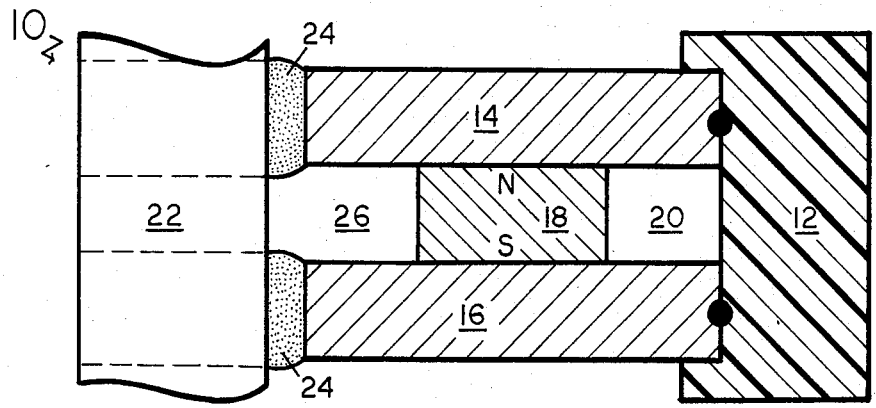
FIG. 1 is a schematic, illustrative, partial sectional view of a prior art two-stage ferrofluid exclusion seal.

FIG. 1 illustrates a standard, prior art ferrofluid exclusion seal apparatus 10 composed of a nonmagnetic housing 12, such as aluminum, and magnetically permeable pole pieces 14 and 16 on either side of an annular axially polarized permanent magnet 18. The housing is statically sealed about the outer or other ends of the pole pieces 14 and 16 by the use of O-ring seals, while there is a ring-like air cavity 20 between the housing 12 and the magnet 18. The seal apparatus 10 is shown in its activated form with a pair of ferrofluid O-ring seals 24 about the surface of a shaft 22 with an intervening air space 26.

In the seal apparatus 10 shown, the magnetically permeable pole pieces normally are uniformly equal and range from about 25 to 60 mils in thickness, while the permanent magnet generally ranges from about 40 mils to 150 mils in thickness. The permanent magnet 18 may be formed of a wide variety of materials such as Plastiform, ceramic or metal material, but generally with an energy product of less than $1.8 \times 10^6$ gauss-oersteds. The ferrofluid 24 is typically a low-vapor-pressure synthetic hydrocarbon or ester-type ferrofluid having a magnetic gauss of about 100 to 400, having a magnetic saturation of about 100 to 400 gauss and having a viscosity ranging from about 50 to 400 cp at 27° C. The shaft 22 employed is typically a rotary magnetically permeable spindle shaft, such as a computer shaft, with a radial gap of from about 2 to 10 mils, with the ferrofluid inserted by the customer into the radial gap after insertion of the magnetically permeable shaft. The ferrofluid forms two separate O-ring seals about the surface of the shaft 22 illustrated by the dotted lines, while an air cavity 26 is formed between the pole pieces.

Figure 2:
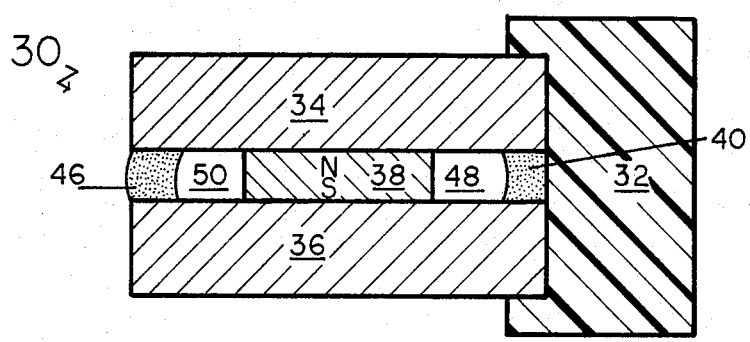
FIG. 2 is a schematic, illustrative, partial sectional view of a self-acting ferrofluid seal of the invention in a nonactivating condition.

FIG. 2 shows a low cost, self-activating ferrofluid seal apparatus 30 of the invention in a nonactivated state which contains a nonmagnetic housing 32, such as of aluminum or plastic, annular, magnetically permeable pole pieces 34 and 36 normally ranging from about 25 to 60 mils in thickness and a thin axially-polarized annular permanent magnet 38 and having a thickness of 10 to 25 mils, and an energy product of greater than about $1.8 \times 10^6$ gauss-oersteds. Typically, the magnet should be formed of a Plastiform material (of 3M Company) or of a molded material, such as an elastomeric material, which may be machined or otherwise formed to the thin thickness required by the ferrofluid seal apparatus. While other permanent magnet materials may be employed, such as ceramic or metal or even polymeric magnets such as nylon, these and other magnet materials are often difficult to prepare, machine, or to manufacture in the thin thickness form required by the invention.

Further, where any permanent magnet material used tends to be porous so as to take up ferrofluid, optionally the magnet material should be coated with a thin exterior coating of a nonmagnetic material, such as a plastic material like a polyurethane or polyvinyl chloride, in order to seal the outer surface of the magnet to reduce the porosity of the magnet material for the ferrofluid.

At the one end of the pole pieces 34 and 36 and in the interstage air gap provided therebetween the ferrofluid 46 is retained in a nonsealing position through the magnetic-flux lines of the magnet. The ferrofluid curves slightly outward from the end of each of the pole pieces 34 and 36, while the other inner end of the ferrofluid is in a slight meniscus form as illustrated so that the ferrofluid conforms generally to the magnetic-flux lines of the permanent magnet 38. At the other end at the ferrofluid seal 30 there is a ring-like air cavity 48 which has been sealed by the use of a ferrofluid 40 shown at the one end of the outer cavity and against the nonmagnetic housing 32 so as to provide for an effective static seal. This ferrofluid in the static seal in position does not move significantly with the insertion of the shaft at the other end, since there is little or only a slight change in the lines of flux. As illustated, any microparticles within the air cavity 50 between the nonactivated ferrofluid 46 and the inner surface of the annular permanent magnet 38 are not released into the atmosphere on activation of the seal, since the ferrofluid seals the air cavity in the nonactivating and activating condition.

Figure 3:
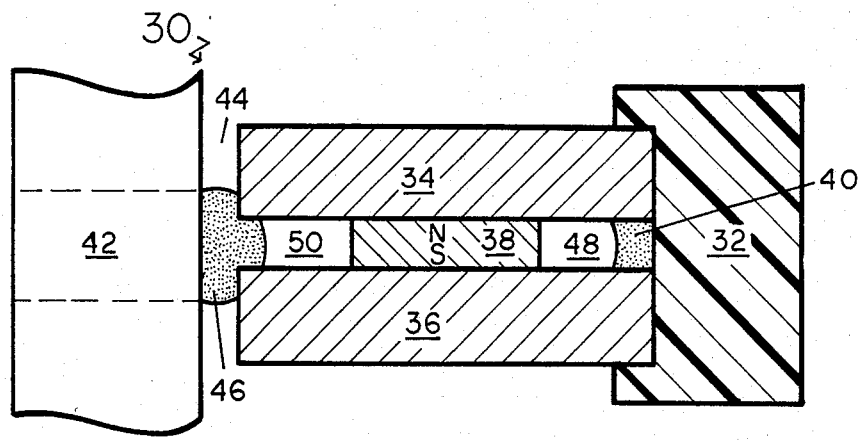
FIG. 3 is a schematic, illustrative, partial sectional view of the self-activating seal of FIG. 2 which has been activated by the insertion of a magnetically permeable shaft and placed in an activated sealing condition.

FIG. 3 shows the low cost, self-activating seal of the invention in the activated state wherein a magnetically permeable shaft 42 has been inserted, and wherein the ferrofluid 46 in the activated state has now moved into the radial gap 44 of 4 to 8 mils to form a generally sectional T-shaped single-stage ferrofluid seal. This exclusion seal of FIG. 3 has been found to possess adequate pressure capacities of greater than 5 inches of water, not to permit the release of microparticles in the air cavity 50, and the axial length of the seal is rediced making for a more compact design.

The employment of a uniform smooth-sided pole-piece elements and the use of a reduced thickness of a magnet provides for a low cost of manufacturing, easy assembly, as well as easy activation of the seal. The configuration of the T-shape ferrofluid exclusion seal provides for longer seal life through the progressive movement of the seal from the single-stage to double seal to single-stage form. The ferrofluid employed is a low-vapor-pressure synthetic hydrocarbon or ester ferrofluid having a magnetic saturation of about 200 to 400 gauss and a viscosity of 50 to 400 cps or 27° C. The radial gap on the magnetically permeable shaft on the one end of the pole pieces 34 and 36 is about 4 to 8 mils, while the air gap between the pole pieces range from about 15 to 25 mils so that the radial gap is less than the interstage gap which is typically two to three times or more than the radial gap. The employment of the ferrofluid 40 at the other end of the outer end of the magnet in the outer cavity 48 eliminates the use of static O-ring seal and helps to prevent flux leakage out of the outer diameter of the ferrofluid seal and through the housing.

What is claimed is:

1. In a ferrofluid seal apparatus, which seal apparatus comprises:
   (a) an annular, permanent magnet adapted to surround a magnetically permeable shaft element whose surface is to be sealed;
   (b) first and second annular, magnetically permeable spaced apart pole-piece elements each having a one and other end with the one end of each of the first and second pole-piece elements adapted to extend into a close, noncontacting relationship with the surface of the shaft element to be sealed to form a first and second radial gaps therewith, the other end of the first and second pole pieces adapted to be placed in a magnetic-flux relationship with the permanent magnet to form an air cavity between the first and second pole pieces;
   (c) ferrofluid adapted to be retained in the first and second radial gaps on the insertion of the shaft element into the seal apparatus to form a ferrofluid liquid O-ring seal about the surface of the shaft element, the ferrofluid retained in the radial gaps by the magnetic flux of the permanent magnet, the improvement which comprises:
   (i) the permanent magnet having a thickness of up to about 25 mils in thickness and greater than the thickness of the first and second radial gaps to form an interstage air gap between the one ends of the first and second pole pieces;
   (ii) the permanent magnet characterized by an energy product of at least about $1.8 \times 10^6$ gauss-oersteds or more;
   (iii) the ferrofluid having a magnetization saturation of at least 200 gauss; and
   (iv) the ferrofluid retained in the interstage air gap between the first and second pole pieces in the nonactivated condition and on the insertion of a magnetically permeable shaft element into the ferrofluid seal apparatus, the ferrofluid moving to form a single-stage ferrofluid seal about the surface of the shaft element.

2. The seal apparatus of claim 1 wherein the first and second radial gap ranges from about 4 to 8 mils, and wherein the interstage air gap ranges from about 15 to 25 mils.

3. The seal apparatus of claim 1 wherein the permanent magnet has a thickness ranging from about 15 to 25 mils.

4. The seal apparatus of claim 1 wherein the flux density in the interstage air gap is about 1,000 gauss or higher.

5. The seal apparatus of claim 1 wherein the first and second pole pieces have a thickness of from bout 25 to 60 mils.

6. The seal apparatus of claim 1 wherein the permanent magnet is composed of a polymeric machinable permanent magnet material.

7. The seal apparatus of claim 1 wherein the permanent magnet has a thin, nonmagnetic coating thereon to reduce the porosity of the permanent magnet material.

8. The seal apparatus of claim 1 wherein the ferrofluid has a magnetization saturation of about 200 to 400 gauss and a viscosity ranging from about 50 to 400 cps at 27° C.

9. The seal apparatus of claim 1 wherein the first and second pole pieces are of substantially equal and uniform thickness.

10. The seal apparatus of claim 1 which includes a nonmagnetically permeable housing about the other end of the pole pieces.

11. The seal apparatus of claim 10 wherein there is a second annular air gap formed between the housing and the other end of the first and second pole pieces and which includes ferrofluid within the second air gap and retained in position to form a ferrofluid static seal with the housing.

12. A ferrofluid exclusion seal system which comprises the ferrofluid seal apparatus of claim 1 and which includes a magnetically permeable shaft element within the seal apparatus, the ferrofluid forming a single-stage ferrofluid liquid O-ring seal about the surface of the shaft element.

13. The system of claim 12 wherein the magnetically permeable shaft comprises a computer-disc-drive shaft wherein the exclusion seal separates a memory-disc area from a contaminating area environment.

14. In a ferrofluid seal apparatus, which seal apparatus comprises:
   (a) an annular, permanent magnet adapted to surround a magnetically permeable shaft element whose surface is to be sealed;
   (b) first and second annular, magnetically permeable spaced apart pole-piece elements each having a one and other end with the one end of each of the first and second pole-piece elements adapted to extend into a close, noncontacting relationship with the surface of the shaft element to be sealed to form a first and second radial gaps therewith, the other end of the first and second pole pieces adapted to be placed in a mangetic-flux relationship with the permanent magnet to form an air cavity between the first and second pole pieces;

(c) ferrofluid adapted to be retained in the first and second radial gaps on the insertion of the shaft element into the seal apparatus to form a ferrofluid liquid O-ring seal about the surface of the shaft element, the ferrofluid retained in the radial gaps by the magnetic flux of the permanent magnet, the improvement which comprises:

(i) the permanent magnet having a thickness ranging from about 15 to 25 mils to form an interstage air gap between the one ends of the first and second pole pieces at the one end of about 15 to 25 mils;

(ii) the permanent magnet characterized by an energy product of about $1.8 \times 10^6$ gauss-oersteds or greater;

(iii) the permanent magnet composed of a polymerical, flexible, machinable material;

(iv) the first and second radial gaps ranging from about 4 to 8 mils;

(v) the ferrofluid having a magnetization, saturation ranging from 200 to 400 gauss and a viscosity ranging from about 50 to 400 cps at 27° C.; and (vi) the ferrofluid retained in the interstage air gap between the first and second pole pieces in the activated stage and on the insertion of a magnetically permeable shaft element into the ferrofluid seal apparatus, ferrofluid moving to form a single-stage ferrofluid O-ring seal about the surface of the shaft element.

15. A ferrofluid exclusion seal system which comprises the ferrofluid seal apparatus of claim 1 and includes a magnetically permeable shaft element within the seal apparatus, the ferrofluid forming a single-stage, sectional T-shaped O-ring seal.

16. A method for providing a self-activating ferrofluid exclusion seal about a magnetically permeable shaft which method comprises:

(a) retaining a defined quantity of ferrofluid in an interstage air gap between and at the one ends of a pair of spaced apart annular pole pieces having generally uniform sides with the other end of the pole pieces in a magnetic-flux relationship with an annular, permanent magnet, the ferrofluid retained in the interstage gap by the magnetic flux of the permanent magnet and the ferrofluid extending only slightly outward of the ends of the pole pieces to form a nonactivated ferrofluid seal capable of shipment with the ferrofluid retained in position in the interstage gap; and (b) forming a ferrofluid O-ring seal about the surface of a magnetically permeable shaft by inserting the shaft within the annular pair of pole pieces, the shaft defining a sealed gap at the one end of the pole piece less than the interstage air gap, the ferrofluid, on inserting into the shaft, may form a nonactivated to an activated seal where the ferrofluid forms a generally T-shaped sectional ferrofluid O-ring seal about the surface of the shaft in the interstage and sealed gaps.

17. The method of claim 16 which includes forming an interstage gap of about 15 to 25 mils and a radial gap of 4 to 8 mils.

18. The method of claim 16 wherein the ferrofluid moves from a nonactivated seal wherein the ferrofluid has a generally cylindrical sectional shape form, with slightly arcuate ends, to an activated seal wherein the ferrofluid has a generally T-shaped sectional form.

* * * * *